United States Patent

[11] 3,625,320

[72] Inventors Peter Doetsch
Altdrossenfeld;
Wilfried F. Roos, Bayreuth, both of Germany
[21] Appl. No. 846,391
[22] Filed July 31, 1969
[45] Patented Dec. 7, 1971
[73] Assignee Stabilus Industrie-Und Handelsgesellschaft MBH
Kobleng-Neuendorf, Germany
[32] Priority Aug. 8, 1968
[33] Germany
[31] P 17 75 416.4

[54] PNEUDRAULIC SHOCK ABSORBER
6 Claims, 1 Drawing Fig.
[52] U.S. Cl. ................................................. 188/269,
188/284, 188/317, 188/320
[51] Int. Cl. ............................................... F16d 69/00
[50] Field of Search .......................................... 188/88 BA,
88 BB, 88.501, 88.503, 96.5, 96.52, 269, 284, 317, 320; 267/64 R

[56] References Cited
UNITED STATES PATENTS
2,608,404 8/1952 Gruss ........................... 267/64
2,621,583 12/1952 Victor .......................... 188/96.52 X
2,760,604 8/1956 Wyeth .......................... 188/88 BA
3,150,747 9/1964 Bliven et al. .................. 188/88 BA
FOREIGN PATENTS
123,713 3/1947 Australia ...................... 188/88.501
941,761 11/1963 Great Britain ................. 188/88 BB Primary Examiner—George E. A. Halvosa
Attorney—Low and Berman ABSTRACT: A pneudraulic shock strut for aircraft has a cylinder which is about half-filled with liquid. The piston assembly which includes the piston and piston rod has two throttling bores of which one has an inlet orifice in a plunger projecting from the piston face directed away from the piston rod and approximately conformingly engageable with a central bore in a resilient ring mounted near an end wall of the cylinder. The outlet orifice of the bore is directed radially from the piston rod. The inlet orifice of the second conduit is axially offset from the first inlet orifice in the annular piston face about the plunger and its outlet is axially directed. The second conduit is closed by the ring when the piston approaches the end of its stroke.

PATENTED DEC 7 1971
3,625,320
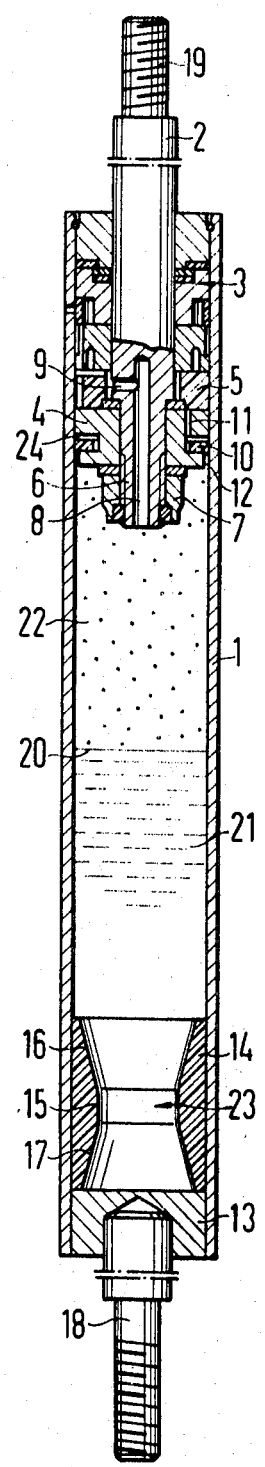
INVENTORS.
Peter Doetsch
Wilfried F. Roos
By: Lowand Berman
AGENTS

PNEUDRAULIC SHOCK ABSORBER

BACKGROUND OF THE INVENTION

This invention relates to shock absorbers of the air-oil type, and particularly to a pneudraulic shock strut for aircraft.

The shock absorbers in aircraft landing gears must be capable of absorbing and dissipating the energy of sudden impacts of the landing gear on the ground. Pneudraulic shock struts have been employed successfully in airplanes equipped with a central hydraulic system which is connected with the shock absorbers for providing the mechanical characteristics necessary, for example, for protecting the rubber tires of the landing gear.

A central hydraulic system suitable for connection to shock struts of the type described is not usually available in small private and business airplanes, and it has been found that a suspension arrangement customary in automobiles or trucks cannot successfully be employed in landing gears because of excessive stresses in the tires.

The object of the invention is the provision of a pneudraulic shock absorber simple enough for use in small aircraft, yet capable of the controlled performance necessary for long tire life, and for properly absorbing and dissipating the energy transmitted to the landing gear upon impact on the ground.

SUMMARY OF THE INVENTION

The shock absorber of the invention is of the type in which the sealed cavity of a cylinder is partly filled with liquid and partly with a highly compressed gas, such as nitrogen, and the cavity is axially divided into two compartments by a piston from which a piston rod projects axially outward of the cylinder.

The cylinder of the invention is filled with enough liquid that an interface of the liquid and of the compressed gas approximately bisects the axial length of the cavity in the upright normal operating position of the shock absorber in which the piston rod projects upwardly from the cylinder. The energy absorbing characteristics of the shock absorber are achieved by a multiplicity of damping means which are partly provided below the normal gas-liquid interface for engagement with the piston assembly and partly on the piston assembly itself, and which increases the resistance to inward movement of the piston rod into the cylinder cavity in response to the decreasing distance between the piston and an axial end wall of the cavity.

Other features, additional objects and many of the attendant advantages of this invention will readily become apparent as the same becomes better understood by reference to the following detailed description of a preferred embodiment when considered in connection with the appended drawing.

BRIEF DESCRIPTION OF THE DRAWING

The sole FIGURE of the drawing shows a pneudraulic shock absorber of the invention in elevational section on its axis.

DESCRIPTION OF THE PREFERRED EMBODIMENT

The shock absorber has a cylinder 1 from which a piston rod 2 projects in an upward axial direction. The cylinder cavity is filled to about half its axial length with hydraulic shock absorber fluid 21, and otherwise with highly compressed nitrogen 22. The cylinder cavity is sealed about the piston rod 2 by an annular upper end wall 3 which also guides the piston rod. The lower end wall 13 is imperforate.

A damping ring 14 is coaxially mounted in the cylinder cavity wall below the gas-liquid interface 20 in abutting engagement with the end wall 13. It consists of oil-resistant elastomeric material, conforms to the cylinder walls in the illustrated relaxed condition, and has an axial bore 23. The outer sections 16, 17 of the bore taper conically toward a central section 15 which is of uniform, cylindrical shape in the illustrated condition of the ring 14.

The axial end of the piston rod 2 in the cylinder 1 carries a piston 4 fastened by a retaining nut 7 to the reduced, partly threaded terminal part 6 of the piston rod which partly projects beyond the annular end face of the piston 4 opposite the end wall 13. The projecting piston rod part and the nut 7 jointly constitute a plunger which is conformingly engageable with the first section 16 of the ring 14.

An axial portion 8 of a throttling conduit extends upwardly from an inlet orifice in the radial end face of the piston rod part 6 and communicates with a radial portion 9 of the conduit whose outlet orifice is in the piston rod 2 above the piston 4. Another throttling conduit between the two cylinder compartments above and below the piston 4 is provided by an annular circumferential gap 12 between the cylinder wall and the reduced lower portion of the piston 4 and by axial bores 11, terminating in the upper radial end face of the piston, only one bore 11 being visible in the drawing. The bores 11 and the gap 12 communicate through an annular circumferential groove 24 in the piston 4 in which a flat valve ring 10 is movable received to close the gap 12 during outward movement of the piston rod 2.

As illustrated in the drawing, the shock absorber is in the fully extended position which it assumes prior to landing, a threaded outer end portion 19 of the piston rod 2 being fastened to the airframe of the craft, and a mounting rod 18 on the end wall 13 being attached to the wheel or wheels in a conventional manner, not shown. The outward movement of the piston rod 2 from the cylinder 1 under the biasing pressure of the gas 22 and the weight of the nonillustrated attached wheel or wheels has come to a halt by abutting engagement of a resilient abutment ring 5 on the end wall 3 with the piston 4 in a terminal position of the piston in which almost all gas 22 and the entire body of liquid 21 is contained in the cylinder compartment between the piston 4 and the end wall 13.

The mass of the aircraft during landing tends to move the piston rod 2 inward of the cylinder 1 when the nonillustrated wheels engage the ground. Resistance to this inward movement is initially light and due entirely to the friction of the compressed gas rushing through the throttling conduits 8, 9 and 12,24,11. As the lowermost part 6 of the piston rod 2 passes the interface 20, the higher friction of the liquid now flowing in the conduit 8,9 increases resistance to further inward movement of the piston rod, and there is a further increase shortly thereafter as the inlet orifice of the gap 12 passes the interface 20.

At this stage of shock absorber operation, liquid is discharged in jets of high velocity from the outlet orifices of the two throttling conduits into the cylinder compartment above the piston 4 in a radial and in an axial direction respectively. The turbulent liquid quickly mixes with the compared gas to generate a foam layer which fills the cylinder cavity above the piston 4.

As the plunger formed by the nut 4 and the downwardly projecting part of the piston rod enters the bore section 16 of the ring 14, the gap 12 is sealed by the rim of the ring. The resistance to further inward piston movement is sharply increased by the resulting reduction in the available throttling conduit section, and to some extent by the resilient resistance of the ring 14. Ultimately, the piston 4 reaches a position in which the entire body of gas 22 and most of the liquid 21 are contained in the cylinder compartment between the piston 4 and the end wall 3.

The shock absorber must be dimensioned to have absorbed actual landing shock at this stage, and the cylinder cavity is now practically completely filled with a foam consisting of all the gas originally present and most of the liquid. The foam has a viscosity between the viscosity of the gas and that of the liquid and performs as a spring and shock absorber while the aircraft rolls on the ground to absorb inertial forces generated as the wheels run over minor obstacles. The foam thereafter collapses to restore the interface 20.

The initial landing shock, which may be comparable in magnitude to the shock resulting from free fall from an appreciable height, is absorbed under conditions in which the shock absorber operates like a very soft spring, while the piston assembly is above the interface 20 thereby protecting the soft tires. Yet, sufficient energy is dissipated by friction in the flowing gas to prevent structural failure of the landing gear. The resilient force of the strut at this stage is not great enough to bounce the craft back into the air.

When the piston assembly enters the liquid, a second phase of operations is started in which the strut has some characteristics of a much harder spring. Ultimately, in the third phase, another change in characteristics adapts the strut to operating conditions similar to those encountered by automotive shock absorbers.

Only very simple devices are employed for sequentially increasing the resistance to axially inward movement of the piston rod 2 into the cylinder 1 under conditions of loading such as those occurring during the landing of an aircraft, and these devices are entirely contained within the cylinder cavity and do not require outside connections. They are also rugged enough to operate over extended periods without repairs or maintenance work. It is not normally necessary to replenish the gas and liquid in the cylinder, but it will be understood that the cylinder 1 is equipped with conventional filling nipples for this purpose, not explicitly shown in the drawing.

It is an important feature of this invention that the interface between the liquid and the gas is approximately halfway between the opposite faces of the end wall 13 and the bottom 30. Further it is important that the upper end of the cylinder is transversed by the piston rod having the piston at its inner end. If one would mount the shock absorber in such a way that the piston rod transverses the lower end of the cylinder, the gas would take a position in the upper port of the cylinder; in the inoperative position of the shock absorber, i.e., if the piston rod has completely been moved outwards of the cylinder, the piston would be fully immerged in the liquid. During a landing operation of the plane after first contact with the runway the piston rod 2 would be moved into the cylinder 1. This means that at the beginning of the damping action this damping action would be relatively strong. Only after the piston rod has moved into the cylinder for a predetermined distance the piston would enter into the gas with the result that the damping would be reduced. One desires however a behavior of the damper which is inverse; therefore it is necessary that the piston rod transverses the upper end of the cylinder. Only when the piston rod transverses the upper end of the cylinder, it is possible that the shock absorber acts as a gas-filled shock absorber in a first stage of its action with the result that the damping action of the shock absorber is very smooth in the first stage. Only after the entrance of the lowermost part 6 of the shock absorber into the hydraulic fluid 21 the stronger damping action of the liquid begins while gas still escapes through the bores 11. In a subsequent stage, hydraulic fluid also passes through the bore 11 and the gap 12. In a further stage the piston rod 2 and its retaining nut 7 enter the damping ring 14 so that the gap 12 is covered and the bore 11 can not be further passed by hydraulic fluid. This means that the hydraulic fluid can only pass the bores 8 and 9 with the result of an increased damping action. The mechanical contact of the retaining nut 7 and the damping ring 14 further increases the damping action due to elastic deformation of the damping ring.

The damping ring 14 has various functions. Due to its construction of elastic material the damping ring 14 forms a mechanical stop. As soon as the piston 4 touches the damping ring 14, the gap 12 and the bore 11 are closed. The hydraulic fluid contained within the damping ring 14 and driven out by the retaining nut 7 can only escape through the bores 8 and 9 from the chamber defined within the damping ring. This further increases the hydraulic damping action.

The damping ring 14 is conically formed at both ends, so that it makes no difference in which position the damping ring is inserted.

The valve 10 is a one-way valve as well known in the art. Due to the presence of this one-way valve the damping action during an outward movement of the piston rod is stronger than the damping action during the inward movement of the piston rod.

What is claimed is:

1. A pneudraulic shock absorber comprising, in combination:
   a. a cylinder having an axis and two axially spaced end walls and enclosing a sealed cavity axially extending between said end walls, one of said end walls being annular;
   b. a piston assembly including a piston rod member axially passing through said annular end wall in sealing, movable engagement, and a piston member fastened to said piston rod member in said cavity and axially dividing the cavity into a first compartment and a second compartment;
   c. a body of liquid in said cavity;
   d. a body of highly compressed gas filling the remainder of said cavity, the amount of said liquid being such that an interface of said gas and of said liquid approximately bisects the axial length of said cavity in the normal operating position of said shock absorber in which said axis extends vertically, said annular end wall bounds said first compartment, and is upwardly spaced from the other end wall bounding said second compartment;
   e. guide means axially guiding said piston member for movement through said interface between a first terminal position in which a substantial portion of said liquid and substantially the entire body of said gas is contained in said first compartment, and said second compartment holds the remainder of said liquid, and a second terminal position in which at least a substantial portion of said body of gas and substantially the entire body of liquid is contained in said second compartment, when said shock absorber is in said normal operating position; and
   f. an annular member of resilient material coaxially mounted in said second compartment adjacent said other end wall and formed with a central aperture axially open toward and said piston assembly,
      1. said piston assembly having a radially extending annular face abuttingly engaged by said annular member in said first terminal position of said piston member,
      2. said piston assembly including a plunger portion centered in said annular face and projecting from the same toward said other end wall, said plunger portion being received in said aperture in said first terminal position of the piston member,
      3. said piston assembly being formed with a plurality of conduits connecting said compartments, a first one of said conduits having an inlet orifice in said annular face, and an additional conduit having an inlet orifice in said plunger portion and axially spaced from the inlet orifice of said first conduit toward said other end wall, said inlet orifices being sealed sequentially by said annular member during movement of said piston member into said first terminal position,
      4. said first conduit and said additional conduit having respective discharge orifice means for discharging jets of fluid into said first compartment in respective directions transverse to each other when said piston rod member moves inward of said cavity.

2. A shock absorber as set forth in claim 1, wherein said piston member is annular, said piston rod member passes through said piston member and partly projects from the same toward said other end wall, the projecting part of said piston rod member being threaded, and a retaining nut threadedly mounted on said part of said piston rod member and axially securing said piston member, said part of the piston rod member and said nut jointly constituting said plunger portion.

3. A shock absorber as set forth in claim 1, wherein said central aperture has a first axial section tapering in an inward direction and remote from said other end wall, a second axial section adjacent said other end wall and flaring toward the same, and a third section connecting said first and second sections, and of uniform cross section in the relaxed condition of said annular member, said plunger portion being shaped for substantially conforming engagement with at least said first section.

4. A shock absorber as set forth in claim 1, wherein said additional conduit has an axial portion contiguously adjacent said inlet orifice, and a radial portion communicating with said axial portion and having a radially directed outlet orifice in said piston rod member in said first compartment.

5. A shock absorber as set forth in claim 1, further comprising valve means mounted on said piston assembly and responsive to axial movement of said assembly in one direction for obstructing said first conduit.

6. A shock absorber as set forth in claim 5, wherein said additional conduit is permanently open.